Patented July 23, 1935

2,009,015

UNITED STATES PATENT OFFICE 2,009,015

CELLULOSE SOLUTIONS

Donald H. Powers, Moorestown, N. J., and Louis H. Bock, Bristol, Pa., assignors to Röhm & Haas Company, Philadelphia, Pa.

No Drawing. Application June 19, 1933, Serial No. 676,530

11 Claims. (Cl. 91—68)

This invention comprises improvements in and relates to the preparation of solutions or dispersions of cellulose or cellulose-like bodies.

It is the object of this invention to prepare filterably solutions of cellulose. It is also a further object to prepare such filterable solutions over a wide temperature range from —20° C. and lower to 80 to 90° C. It is a further object of this invention to obtain substantially complete solution of alpha cellulose without recourse to violent agitation and disintegration. It is an object of this invention to prepare concentrated solutions of cellulose which are stable to light and storage.

While it has long been known that organic bases have a swelling action on alpha cellulose or degraded cellulose materials, these bases have heretofore found no practical application because they showed little, if any, advantage over aqueous solutions of inorganic hydroxides. Tetramethylammonium hydroxide was found to produce appreciably swelling of cellulose materials by Knecht & Harrison (Journal of the Society of Dyers and Colorists, 28, 224 (1912)) and also by Dehnert & König (Celluloschemie, 6, 1 (1925)).

We have found that aqueous solutions of tetramethyl and tetraethylammonium hydroxides compare with aqueous solutions of sodium hydroxide as swelling and mercerizing agents for cellulose materials. Aqueous solutions of the guanidines such as guanidine, methyl guanidine, dimethyl guanidine and butyl guanidine, which are among the strongest bases known, (Journal of the American Chemical Society 54, 1499 (1932)) appear to have much less swelling action than solutions of the inorganic hydroxides.

While these organic bases, inorganic hydroxides, or their mixtures, may have a swelling action on cellulose, they do not give filterable solutions of cellulose suitable for spinning and the production of synthetic fibers. The viscose process for rayon manufacture depends on the formation of the soluble or dispersible cellulose xanthate, a compound prepared from the insoluble alkali cellulose by the action of carbon disulphide.

We have found that quaternary ammonium bases of relatively high molecular weight, notably those containing a benzyl group are unique and striking in their action on alpha cellulose. We find that these benzyl substituted ammonium hydroxides have a substantially complete and rapid solvating action on alpha cellulose and cellulosic materials. These benzyl substituted ammonium hydroxides act within a very short time to form clear, viscous, filterable solutions of alpha cellulose from which the cellulose can be precipitated in a form which is still substantially insoluble in either caustic or the common organic bases such as guanidine or tetramethylammonium hydroxide. We find that when sulphite pulp containing substantially 80 to 95% alpha cellulose is treated with 20 times its weight of a benzyl substituted ammonium hydroxide solution of a concentration as outlined in this application, that rapid swelling immediately occurs and that within an hour substantially complete solution of this material occurs. This viscous solution may be filtered through a Jena glass fused-in porous filter disk with a pore diameter of 20 to 30 microns. The filtrate which is obtained is a clear viscous solution and may be spun to form cellulose fibers or sheeted to form cellulose sheets by running the solution into any precipitating or coagulating bath such as acid or salt solutions. We find that aqueous solutions of benzyl substituted ammonium hydroxides of concentrations of 25% to 50% possess this unique solvent property and when these concentrated solutions are diluted with water or alkali their unique solvent action disappears and they become powerful swelling agents and gelatinizing agents depending on the degree of dilution. For example, solutions of trimethylbenzylammonium hydroxide with a concentration greater than 2 normal form clear solutions high in alpha cellulose. When this hydroxide is diluted with an equal part of water to give a 1 normal solution the resulting aqueous solution is no longer a solvent for cellulose, but has a powerful gelatinizing action and swelling or mercerizing action. When this base is diluted still further, it appears to be a swelling agent approximating the activity of all concentrations of the strong organic bases such as tetramethylammonium hydroxide, tetraethylammonium hydroxide, guanidine, methyl guanidine and dimethyl guanidine. When this dilute aqueous solution of benzyl substituted ammonium hydroxide is cooled to temperatures substantially below 0° C. its swelling action is improved but it does not become a true cellulose solvent and does not form filterable cellulose solutions suitable for spinning.

We find that the temperature at which cellulose is dissolved has little effect on the rate of solution, but that weak aqueous solutions are improved as cellulose swelling agents at temperatures below 0° C. We find that the benzyl substituted ammonium hydroxides in aqueous solution in concentrations usually above 25% are unique as solvents for cellulose and that while a change in temperature affects the rate of solution it does not appear to convert non-solvents into solvents. The minimum concentration of a benzyl substituted ammonium hydroxide which acts as a cellulose solvent varies with the chemical nature of the compound. In general, all concentrations above the minimum concentration required are effective. Obviously, from an economical point of view, it is preferable to use the minimum concentration necessary to effect true solution. For example, a 2.1 normal solution of trimethylbenzylammonium hydroxide which is equivalent to a 35% solution, is a very effective cellulose solvent, but on dilution to a normality of 1.9 it loses its solvent action, but remains a powerful swelling agent. On the other hand, a 1.8 normal solution of dimethylbenzylphenylammonium hydroxide, which is equivalent to a 42% solution, is a powerful cellulose solvent forming clear viscous solutions, but on dilution becomes a swelling agent, giving swollen but intact cellulose fibres even when cooled, with alpha cellulose.

We have also found that these filterable solutions of cellulose prepared with a benzyl substituted ammonium hydroxide may be, under carefully controlled conditions, diluted with water, without precipitation of the cellulose if protective agents or dispersing agents are present. For example, with an 8% solution of alpha cellulose in trimethylbenzylammonium hydroxide is diluted with an equal volume of water, a flocculent precipitate comprising hydrated cellulose slowly separates. However, if a dispersing agent such as trimethylbenzylammonium oleate or sodium oleate is added to this cellulose solution it can be diluted with an equal volume of water without the separation of any cellulose and forms a clear limpid cellulose solution which can be used for spinning or as a coating material.

The term cellulose has come to be used loosely to cover a wide variety of materials containing cellulose or cellulose degradation products, but it is evident that alpha cellulose is one of the most resistant and most stable forms of cellulose. The action of oxidizing agents, reducing agents, acids, salts and heat frequently cause the degradation of alpha cellulose into more soluble or more readily swollen forms. In our discussion we have usually referred to alpha cellulose, since our experience has indicated that all the other forms of cellulose will dissolve or swell under conditions which will dissolve or cause a swelling of alpha cellulose. On the other hand, many conditions will swell these other forms of cellulose which will not swell the alpha cellulose. Sources of cellulose which we have found to be at least as easily dispersed and usually more readily acted upon than alpha cellulose are the following:

(1) Bleached or unbleached sulphite or sulphate cellulose.

(2) Bleached or unbleached cotton or cotton linters.

(3) Mechanical wood pulp.

(4) Cellulose oxidation products obtained from cellulose or cellulose containing bodies.

(5) Cellulose products obtained by treating cellulose containing materials with alkali of varying strengths with or without pressure.

(6) Regenerated cellulose such as viscose rayon, cuprammonium rayon, denitrated cellulose nitrate, or saponified cellulose acetate or formate. Any regenerated cellulose products precipitated from solution or dispersion in sulphuric acid, phosphoric acid, zinc chloride, calcium thiocyanate solutions, or the like.

(7) Cellulose esters or ethers.

(8) Any form of hydrated cellulose or hydrocellulose.

We have found that compounds of the following general formula appear to be unique as cellulose solvents.

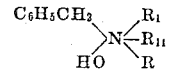

Where R, $R^1$, $R^{11}$ are alkyl, aryl and/or aralkyl groups or substituted derivatives thereof. It is evident that these derivatives must be soluble in water to give strongly basic solutions to be effective as cellulose solvents. However, it is evident that the solvent action of these compounds is not solely dependent on their basicity.

Among the benzyl substituted quaternary ammonium hydroxides which have been found to be cellulose solvents are: trimethylbenzylammonium hydroxide, triethylbenzylammonium hydroxide, dimethylphenylbenzylammonium hydroxide, diethylphenylbenzylammonium hydroxide, dimethyltolylbenzylammonium hydroxide, dimethylamylbenzylammonium hydroxide, dimethyldibenzylammonium hydroxide and benzyl pyridonium hydroxide.

It is clear to anyone skilled in the art that other benzyl tetra substituted ammonium hydroxides would also be effective. The methyl groups may be replaced by other alkyl groups such as propyl, amyl, etc., and phenyl groups replaced by tolyl, xylyl or naphthyl groups. It is also clear that these compounds may be applied in a wide variety of methods without departing from the spirit of this invention. On account of their unusual stability they may be applied over a wide range of temperatures even up to 100° C. Extremely dilute solutions may also be used, since it is possible to concentrate the active constituent in the presence of a cellulosic body.

It is clear that these cellulose solvents are of particular interest in the rayon, textile and paper industries where cellulose and its derivatives are extensively employed. Since solutions of cellulose in these bases are frequently twice as concentrated as those usually obtained, and since they can be rapidly prepared, it is obvious that the use of these bases is of tremendous advantage in the preparation of cellulose solutions. Since these cellulose solutions appear to be much more stable to storing, to light and to heat than cellulose solutions or dispersions, as prepared, for example, in the viscose process, it is clear the use of stable solutions offer many practical advantages.

We find that solutions of cellulose prepared with the aid of a benzyl substituted quaternary ammonium hydroxide are of particular advantage for the coating of cellulose containing materials such as cotton, rayon or paper. These cellulose solutions, in marked contrast to the solutions of viscose, still possess a powerful swelling and mercerizing action. It is, consequently, possible to coat a cotton fabric with our cellulose solution and at the same time effect a mercerization and swelling of the cotton fabric. The fabrics treated in this way are remarkably linen-like in their appearance as they are free from fine cotton hairs, possess a high transparency, are extremely adsorbent and unaffected by washing.

These cellulose solutions may also be used for coating other types of non-cellulosic materials such as leather, silk, wool or rubber. It is of particular interest that the cellulose solutions may be precipitated by the addition of water, alkali or acid. It is clear that the cellulose in these solutions may be precipitated on the material by passing the coated fabric into cold water.

By the addition of organic or inorganic pigment colors to these cellulose solutions colored effects may be obtained which are fast to washing. The swelling action of the benzyl substituted ammonium hydroxide assures good penetration of the coloring material into the fiber and the precipitation of the cellulose fixes the color in the fiber so that it is not readily removed by washing.

The following examples will serve to illustrate the invention:

1. Five parts of bleached cotton linters are stirred into 95 parts of 1.8 normal dimethylphenylbenzylammonium hydroxide at room temperature. The linters wet out immediately and gelatinize within a very short time. Within two hours a viscous cellulose solution is formed which is suitable for spinning, coating or sheeting. It is filtered through a filter consisting of a mat of asbestos fibers.

2. Ten parts of rayon waste consisting of viscose rayon fibers are added to 150 parts of 2.1 normal trimethylbenzylammonium hydroxide at room temperature. This mixture is gently stirred for one to two hours, to form a clear viscous solution which may be run into an acid coagulating bath in the form of a sheet to form a clear continuous film.

3. One hundred parts of finely divided cellulose fiber which has been cooked with alkali under pressure by the sulphate process is mixed with 2,000 parts of 2 normal dimethyldibenzylammonium hydroxide. The mixture is allowed to stand for one hour and then stirred for one hour. It may be filtered to remove traces of undissolved material or used without filtration. The cellulose may be precipitated in any of the usual methods, such as running into an acid coagulating bath, into an organic solvent, or into a strong salt solution.

4. Ten parts of rayon waste consisting of cuprammonium rayon fibers are added to 400 parts of 0.7 normal triethylbenzylammonium hydroxide and the mixture is heated on a steam bath in an open vessel. The hydroxide is concentrated by the evaporation and the rayon fibers slowly gelatinize and finally dissolve so that by the time the volume of liquid has been reduced to one-third, that is, to 135 parts, the solution is complete.

5. A 6% solution of bleached cotton linters dissolved in 2.4 normal trimethylbenzylammonium hydroxide is filtered and spun into a coagulating bath of sulphuric acid or of another mineral acid.

6. A 8% solution of cellulose as obtained from rayon waste dissolved in 2.0 normal diethylphenylbenzylammonium hydroxide is filtered through a spun glass filter, aged for 30 hours and spun into a coagulating bath consisting of a mixture of sulphuric acid, sodium sulphate and glucose.

7. A cotton jacquard fabric is run through a 33% aqueous solution of trimethylbenzylammonium hydroxide containing 5% dissolved rayon fiber. The coated fabric is run through a squeeze roll, aged 3 to 5 minutes in the vat ager, run through a solution of dilute acid, dried and given a hot friction calender. The resulting fabric has a high permanent luster which is not readily removed by repeated washings.

8. A cotton-rayon alpaca is run through a solution prepared by diluting a 6% solution of cellulose in 43% dimethylphenylbenzylammonium hydroxide with an equal volume of water after the stabilization of the cellulose solution by the addition of 2% trimethylbenzylammonium oleate. The impregnated fabric is run into dilute acid, then into boiling soap, dried and calendered. The resulting fabric has a permanent finish comprising precipitated cellulose fixed on the fiber.

9. Damask effects may be obtained on cotton fabrics by printing them with a 4% solution of cotton linters dissolved in 2 normal dimethyldibenzylammonium hydroxide which has been pigmented by the addition of 25% of finely divided zinc oxide. The printed fabric is air dried, run into dilute acid, dried and calendered to give a permanent damask effect which is fast to washing.

10. A sheet of uncalendered sulphite paper is coated with a solution containing 8% cellulose dissolved in 35% trimethylbenzylammonium hydroxide. This coated paper is run into dilute acid, dried and given a heavy friction calender to give a permanent finish of high luster.

11. Colored fabrics which are fast to washing may be obtained by coating a cotton broadcloth with a solution of cellulose in triethylbenzylammonium hydroxide of the following composition.

| | |
|---|---|
| Alpha cellulose | 3 |
| Triethylbenzylammonium hydroxide (40%) | 75 |
| Corn dextrine | 3 |
| Glycerine | 2 |
| Titanium oxide | 15 |
| Vermillion | 2 |

12. Colored stripe effects may be obtained by printing on a fabric the following paste. After the printing the fabric is dried, run into cold water, given a hot soaping, rinsed and dried.

| | |
|---|---|
| Sulphite cellulose | 4 |
| Trimethylbenzylammonium hydroxide (35%) | 80 |
| Wheat starch | 4 |
| Zinc oxide | 10 |
| Glycerine | 1 |
| Indanthrene blue GCD dbl. paste (color index No. 1113) | 1 |

It is understood that these examples are given by way of illustration and not limitation and that the scope of the invention is limited only by the following claims.

What we claim is:

1. The process of forming a cellulose solution which comprises treating a cellulosic body with a quaternary benzylammonium hydroxide.

2. The process of forming a cellulose solution which comprises treating a cellulosic body with an aqueous solution containing a quaternary benzylammonium hydroxide.

3. The process of forming a cellulose solution which comprises treating a cellulosic body with an aqueous solution containing a compound having the formula $C_6H_5CH_2NRR^1R^{11}OH$ where R, $R^1$ and $R^{11}$ are alkyl, aryl or aralkyl groups.

4. The process of forming a cellulose solution which comprises treating a cellulosic body with a solution containing trimethylbenzylammonium hydroxide.

5. The process of forming a cellulose solution which comprises treating a cellulosic body with a solution containing trimethylbenzylammonium hydroxide at temperatures substantially above 0° C.

6. A solution containing a cellulosic body and a quaternary benzylammonium hydroxide.

7. A solution containing a cellulosic body, a quaternary benzylammonium hydroxide and a dispersing material.

8. A process of forming a cellulose solution which comprises treating a cellulosic body with a quaternary benzyl ammonium hydroxide of a concentration of 25 to 50%.

9. A process which comprises applying to a textile fabric comprising undegraded cellulose a solution containing a cellulosic body and a quaternary benzylammonium hydroxide and subsequently precipitating the dissolved cellulose on the fabric.

10. The process of forming a solution of substantially undegraded cellulose which comprises treating a substantially undisintegrated cellulose with a quaternary benzyl ammonium hydroxide.

11. A solution containing a substantially undegraded cellulose and a quaternary benzyl ammonium hydroxide.

DONALD H. POWERS.
LOUIS H. BOCK.